United States Patent [19]
Chiesa

[11] 3,818,497
[45] June 18, 1974

[54] AUTOMATIC APPARATUS FOR TAKING AND DEVELOPING PHOTOGRAPHS

[75] Inventor: Luigi Chiesa, Turin, Italy

[73] Assignee: Morenar S.A., Fribourg, Switzerland

[22] Filed: Jan. 22, 1973

[21] Appl. No.: 325,440

[52] U.S. Cl. .................. 354/89, 354/83, 355/54, 355/70
[51] Int. Cl. .......................... G03b 17/50
[58] Field of Search....... 95/11 R, 14, 18 R; 355/54, 355/67, 70

[56] References Cited
UNITED STATES PATENTS

| | | | |
|---|---|---|---|
| 1,748,523 | 2/1930 | Smith | 355/70 |
| 1,795,050 | 3/1931 | Simjian | 355/70 X |
| 2,541,016 | 2/1951 | Allen | 95/14 |
| 3,618,495 | 11/1971 | Kuhns | 95/18 R |
| 3,693,522 | 9/1972 | Chiesa | 95/14 |

*Primary Examiner*—Fred L. Braun
*Attorney, Agent, or Firm*—Wenderoth, Lind & Ponack

[57] ABSTRACT

Apparatus for producing identity documents complete with a photograph of a person comprises a cabinet containing operative parts including a photographic assembly for taking pictures and an assembly for developing the reversible paper. The photographic assembly has two objectives mounted at right angles to each other on respective walls of a dark chamber. One of the objectives receives an image of the person via a 45° mirror and projects the image onto the paper in the chamber through a hole in a wall extending diagonally across the chamber. The other objective receives an image of an illuminated matrix bearing information to be included in the identity documents and projects this image onto the paper in the chamber via a mirror-forming part of the diagonal wall. A white border is produced around the pictures by a frame of transparent material with punctiform light sources arranged in a groove around the frame, inside surfaces of which are painted black to keep the light from the light sources away from the pictures. A viewfinder is provided to enable an operator to check that the person is correctly positioned for the photograph.

6 Claims, 8 Drawing Figures

AUTOMATIC APPARATUS FOR TAKING AND DEVELOPING PHOTOGRAPHS

BACKGROUND OF THE INVENTION

The present invention relates to an automatic photographic apparatus for taking and developing photographs.

U.S. Pat. No. 3,693,528 discloses an automatic apparatus for taking and developing photographs, the apparatus comprising, in combination, a cubicle accessible to the user and a cabinet containing the operative parts such as a photographic assembly for taking pictures, and an assembly for developing the reversible paper. The apparatus which is the subject of U.S. Pat. No. 3,693,528 is preset for selectively carrying out several programmes so as to obtain: a large-format picture of the subject, a plurality of small-format pictures of the subject in either identical or different sittings, two small-format pictures combined with characteristic views, two small-format pictures combined with two blank spaces which may be utilized, for example, for preparing documents.

It is an object of the present invention to provide an automatic apparatus for preparation of complete identity documents provided with pictures. It is another object of the invention to provide an apparatus of the aforementioned type for production of the required documents in a rapid, precise and economic manner.

SUMMARY OF THE INVENTION

The main characteristic of the apparatus according to the present invention consists in that the photographic assembly comprises a dark chamber which is provided with a part-pierced and part-mirror-like diagonal wall, at least one photographic objective mounted on a wall of the chamber and adapted to take the subject through a mirror and to project the subject's image through the pierced portion of the diagonal wall and onto a strip of reversible paper so as to expose only a portion of the surface of said strip and at least a second photographic objective which is mounted on another wall of the chamber adjacent to that on which the first objective is mounted, and is adapted to take a matrix bearing all written data which have to appear on the identity document to be obtained, and to project the matrix image onto the remaining surface portion of the reversible paper through reflection onto the mirror-like portion of the diagonal wall; optical means being provided outside said chamber to allow an operator to control the position of the subject relative to the first objective.

DESCRIPTION OF THE PREFERRED EMBODIMENT

Figure 1:
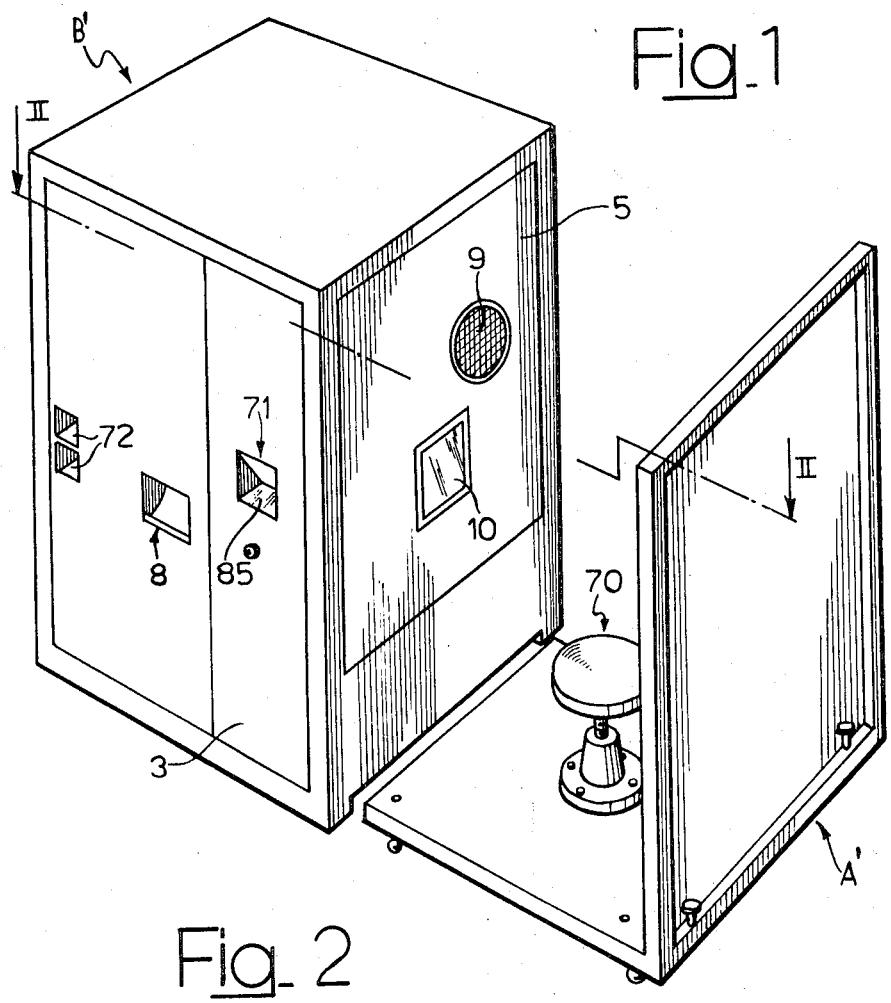
FIG. 1 is a diagrammatic and perspective view of an automatic apparatus in accordance with the present invention.
Figure 2:
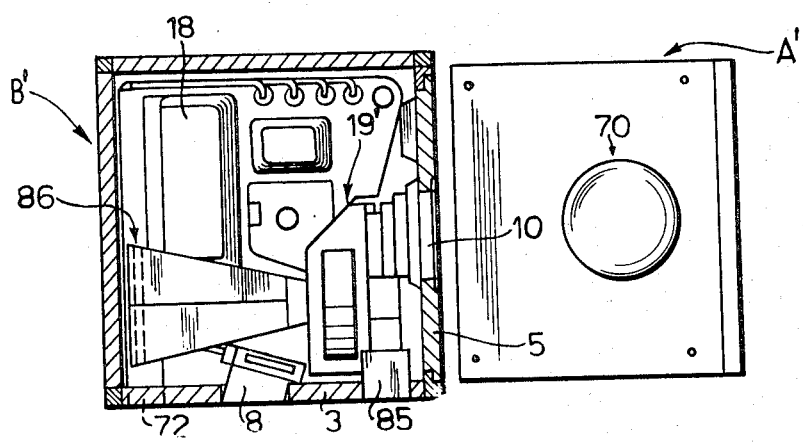
FIG. 2 is a transversal section along line II—II of FIG. 1.
Figure 3:
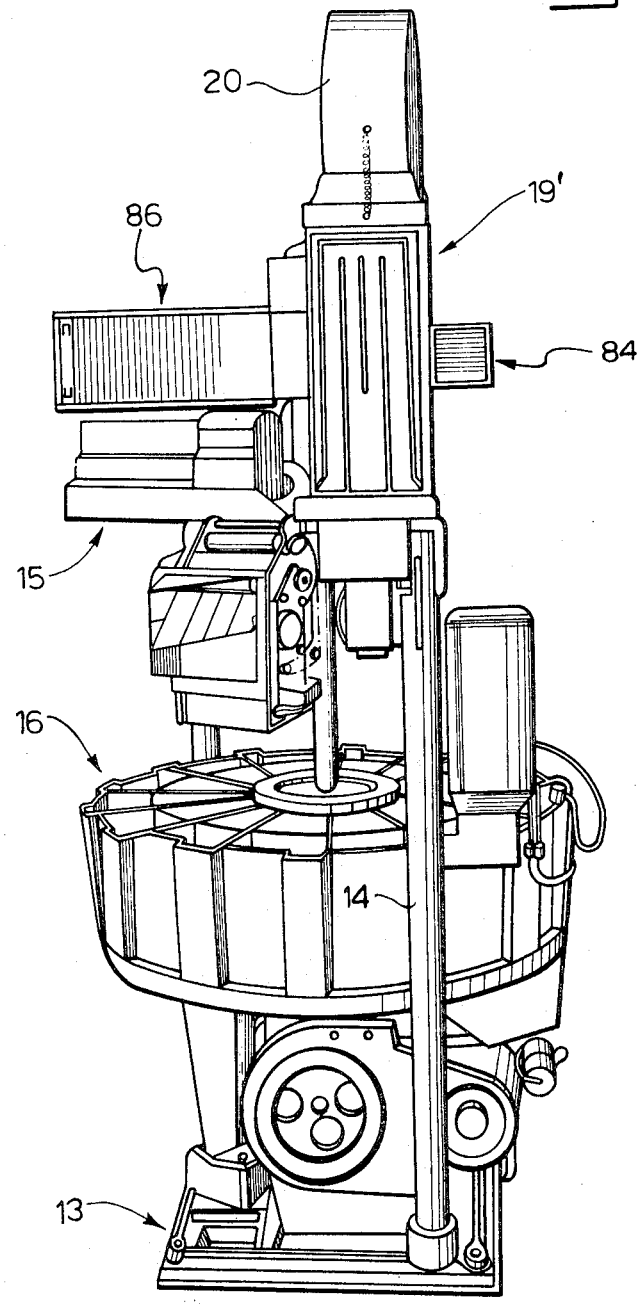
FIG. 3 is a perspective view of the internal elements of the cubicle.
Figure 4:
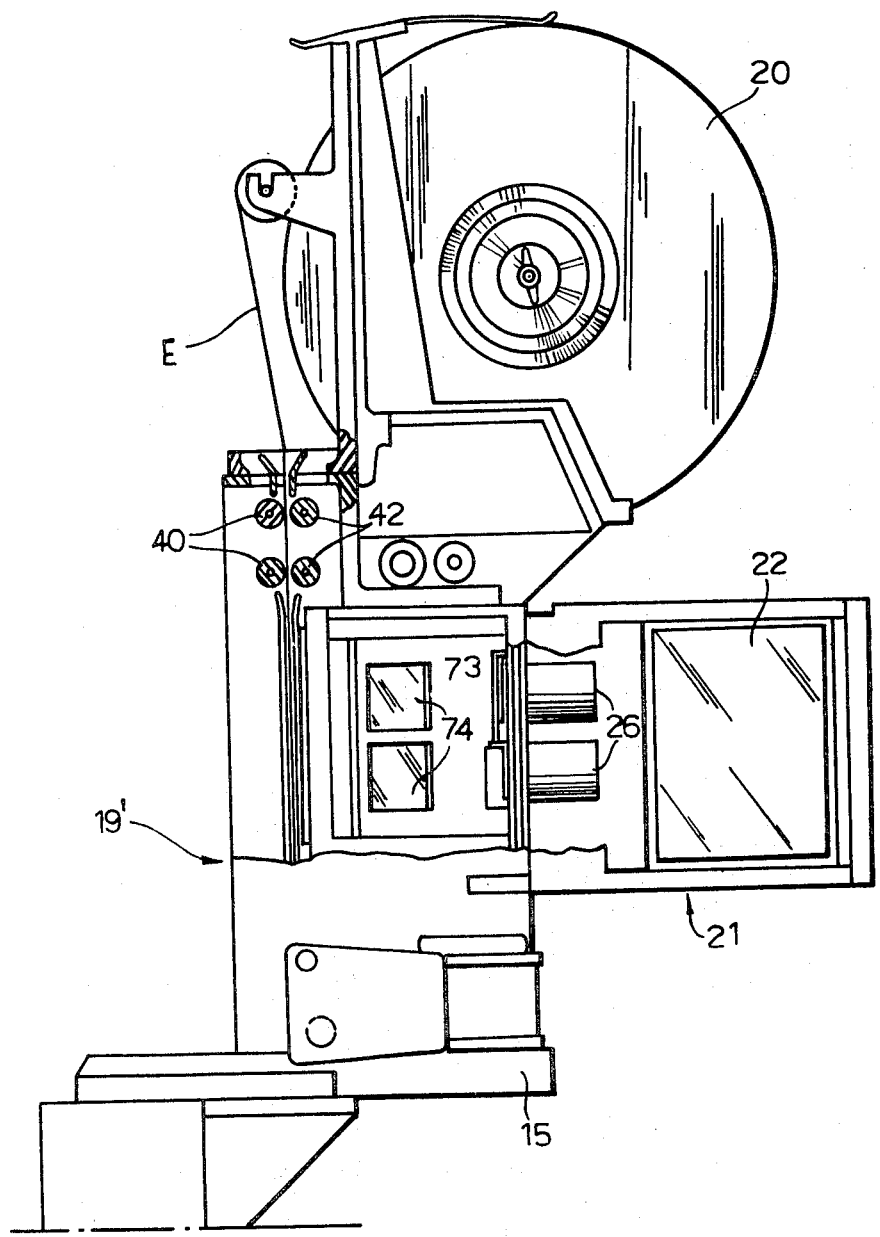
FIG. 4 is a diagrammatic lateral elevation of the upper part of the apparatus.
Figure 5:
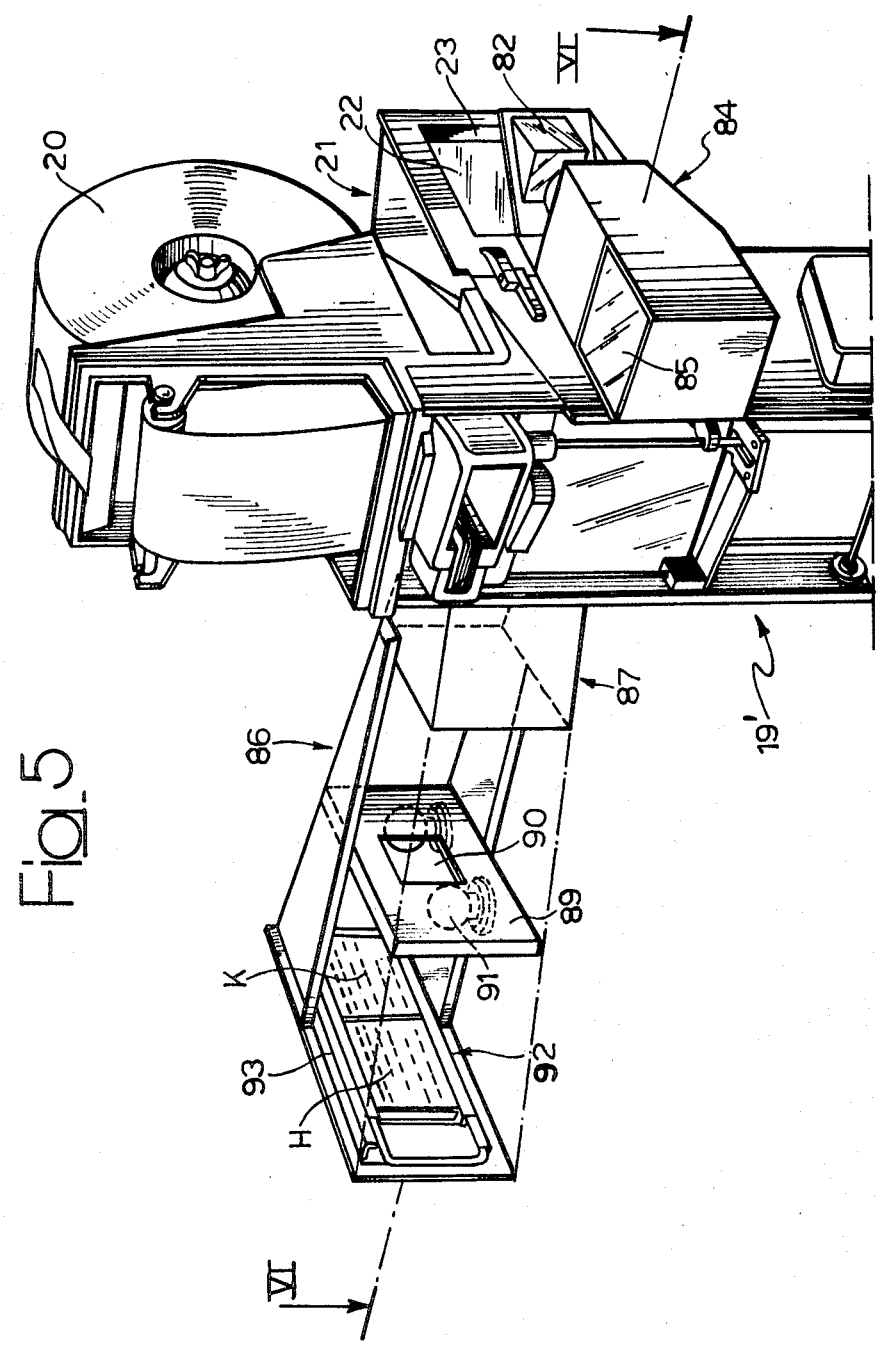
FIG. 5 is a perspective diagrammatic view thereof.
Figure 6:
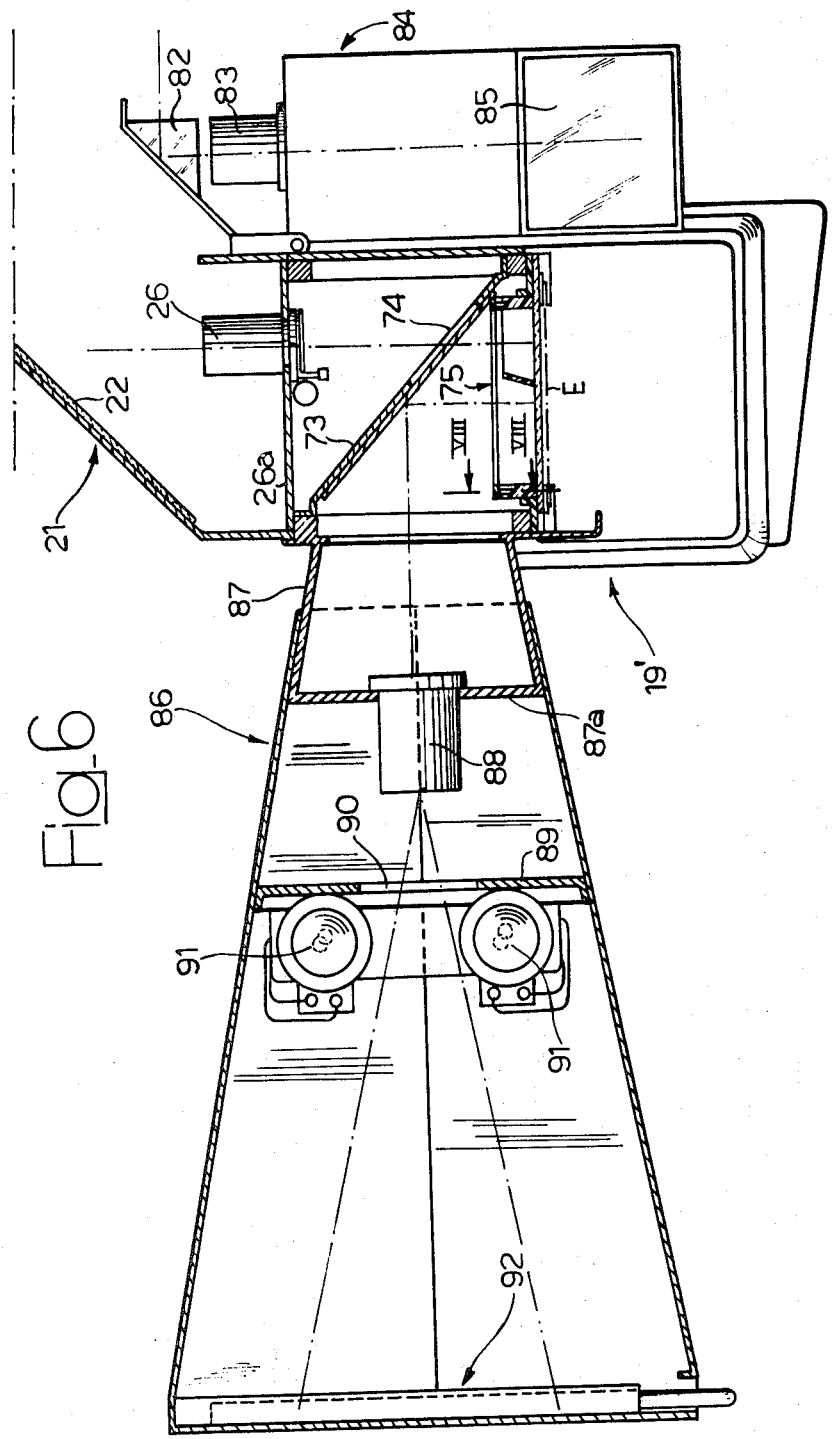
FIG. 6 is a longitudinal diagrammatic section along line VI—VI of FIG. 5.
Figure 7:
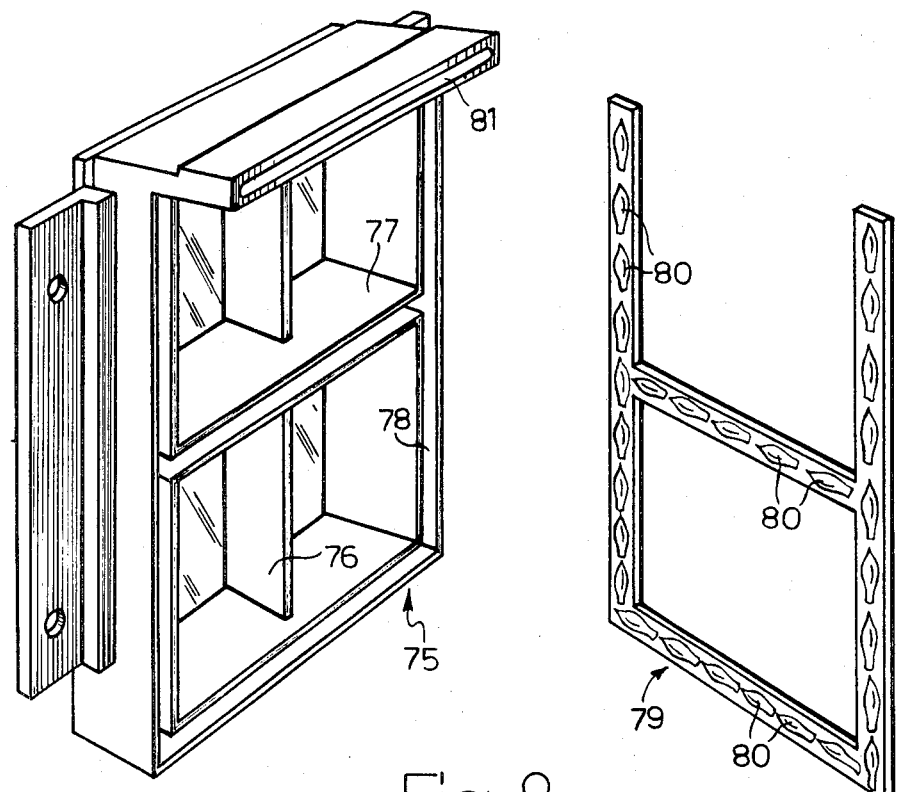
FIG. 7 is a perspective exploded view of one of the elements of the apparatus.
Figure 8:
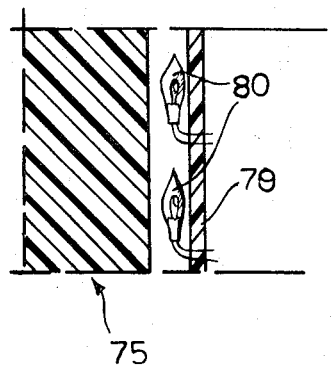
FIG. 8 is an enlarged partial transversal section along line VIII—VIII of FIG. 6.

The photographic apparatus in accordance with the present invention comprises a cabinet B' in which all the component parts of the apparatus are arranged, and an auxiliary element A' consisting of a base and a partition and provided with a stool 70 for accommodating the subject to be photographed.

The cabinet is provided with a wall in the form of a door 5 in which an aperture 10 for the photographing of the subject and an aperture with lamps 9 for illuminating the subject are provided.

Moreover, the cabinet B' can be laterally opened since it is provided with a door 3 in which there are provided an aperture 8 for withdrawing the pictures or documents produced, a viewfinder aperture 71 for checking the position of the subject, and one or two apertures 72 for inserting the matrices or facsimiles of the documents to be obtained.

An assembly of elements is arranged within the cabinet B' and comprises an assembly 16 for developing the reversible paper, said assembly being supported by a supporting frame, consisting of two parallel plates 13, 15 connected to each other by uprights 14, and a photographic assembly which is, in particular, the subject of the present invention.

The apparatus shown by way of example is preset so as to provide two identity documents per cycle.

At 19' a supporting frame is provided which supports on its top a container or magazine 20 for the reversible paper to be used by the apparatus. A shaped element 21 is laterally connected to supporting frame 19' and supports an inclined mirror 22 arranged adjacent the aperture 10 of the cabinet. The image of the subject is taken by two superimposed photographic objectives 26 fixed to a wall 26a of a dark chamber, forming part of the aforementioned frame, and transmitted onto the reversible paper E through a wall 73 provided with apertures 74 and arranged diagonally within the chamber. The bottom of the chamber is closed by a plate or frame 75 which is formed of transparent material and is provided with intersecting plates 76, 77 and has a peripheral recess 78; a recess is also provided at the edge of the horizontal plate 77. Said recesses house an inserted element 79 which is provided with punctiform light sources 80; similar light sources are arranged within a hollow edge 81 of the supporting frame so as to form a border frame surrounding two superimposed portions of reversible paper which are exposed simultaneously to obtain the two distinct documents. The inside walls of the frame are painted black to confine the light from light sources 80 to the border frame, away from the pictures.

The images of the subject, when taken by the two objectives 26, are transmitted onto the two portions of reversible paper E through the apertures 74 of wall 73 and two portions of the plate 75 so as to expose a part of said two portions of reversible paper.

The remaining part of the two portions of reversible paper will bear the photographic reproduction of the documents as far as their written part is concerned which comprises identify data such as the name and other data of the subject. To this purpose the chamber wall adjacent to wall 26a supporting the objectives 26 is provided with a box-shaped extension 87 the outer wall 87a of which supports two further superimposed photographic objectives 88 at right angles to the first pair of objectives. The objectives of said second pair are oriented toward a slidable frame 92 on which two matrices H, K of the documents to be obtained are arranged. The slidable frame 92 is mounted in guides 93 supported by a supporting frame 86 extending from extension 87 which is fixed to supporting frame 19'. Supporting frame 86 has a transverse wall 89 provided with a central aperture 90 for taking the aforementioned documents and behind which two lamps 91 are arranged for illuminating the matrices of the documents.

Beside the supporting frame 19' an optical assembly 84 is arranged for controlling the position of the subject; said assembly comprises a reflecting prism 82 which is arranged at the outer side of element 21 so as to have one of its faces facing the aperture 10 through which the subject is visible, an objective 83 and a focussing screen 85 on which the subject's image is formed. Said focussing screen is arranged at the lateral aperture 71 of cabinet B' so that an operator outside the cabinet can see whether the subject is in the correct position relative to the objectives 26.

The slidable frame 92 carrying the facsimiles of the documents can be extracted through one of the apertures 72 of the cabinet for replacement of the matrices to be photographed.

The described apparatus is thus capable of producing with high speed and precision identity documents provided with photographs such as membership cards and the like which may be also provided with a transparent plastics cover.

The two documents which are produced in each operative cycle may be either identical, i.e. when one of them has to be placed on file, or different.

When the picture has been taken, the reversible paper is advanced one step and the exposed part is cut and sent to the developing unit in the way already known from U.S. Pat. No. 3,693,528.

Naturally, the embodiments and the particulars of construction may be largely varied relative to what is described and shown herein without changing the principle and departing from the scope of the present invention.

I claim:

1. Apparatus for photographically producing an identity document with a picture of a person and a photographic record of identity data on a piece of photographic paper, comprising: a cabinet; a first location adjacent the cabinet for the person to be photographed; means for storing reversible photographic paper inside the cabinet; a photographic assembly inside the cabinet; said photographic assembly comprising a plurality of walls in combination defining a dark chamber; a further wall extending diagonally across the interior of the dark chamber; one part of said further wall having an aperture therein; another part of said further wall bearing a reflective surface; means for feeding a piece of the photographic paper to a second location at one side of said chamber opposite a first one of the chamber-defining walls; a first objective mounted on said first wall in register with the aperture in said further wall for projecting an image of the person through the aperture onto a first part of the piece of photographic paper; a first aperture in the cabinet facing said first location; means inside the cabinet in register with said first aperture in the cabinet for reflecting the image of the person through an angle towards said first objective; means for mounting a data-bearing matrix inside the cabinet at a predetermined third location; means for illuminating said matrix at said third location; a second objective mounted on a second one of said chamber-defining walls in register with the reflective surface of said further wall and in optical registration with said predetermined third location for the matrix, for projecting an image of the matrix onto said reflective surface, to be reflected through an angle onto a second part of the piece of photographic paper; the apparatus also comprising means inside said cabinet for developing the piece of photographic paper after pictures have been taken thereon of the person and of the data, means for enabling the piece of photographic paper to be extracted from the cabinet after development; and viewfinder means for checking positioning of the person relative to the photographic assembly for the picture of the person to be taken.

2. Apparatus as defined in claim 1 and further comprising a fixed frame formed of transparent material arranged adjacent said second location at said one side of said chamber to where the piece of photographic paper is fed; the frame having at least one cavity therein adjacent a border-forming region of the piece of photographic paper; at least one light source in said at least one cavity for illuminating said border-forming region of the piece of photographic paper; and means or shielding light produced by said at least one light source from said first and second parts of the piece of photographic paper.

3. Apparatus as defined in claim 1 and further comprising a third objective mounted on said first wall in register with the aperture in said further wall for projecting another image of the person through the wall aperture onto a third part of the piece of photographic paper and a fourth objective mounted on the second wall in register with the reflective surface of said further wall and in optical registration with said predetermined third location for the matrix, for projecting another image of the matrix onto said reflective surface, to be reflected through an angle onto a fourth part of the piece of photographic paper.

4. Apparatus as defined in claim 1 wherein said means for mounting the matrix inside the cabinet at said predetermined third location comprises a slidable frame, guide means for slidably supporting the slidable frame, means supporting the guide means relative to the photographic assembly and means for mounting the matrix in the slidable frame.

5. Apparatus as defined in claim 1 and further comprising a fixed frame formed of transparent material arranged adjacent said second location at said one side of said chamber to where the piece of photographic paper is fed; the frame having at least one cavity therein adjacent a border-forming region of the piece of photographic paper; at least one light source in said at least one cavity for illuminating said border-forming region of the piece of photographic paper, and means for shielding light produced by said at least one light source from said first and second parts of the piece of photographic paper; and further comprising a third objective mounted on said first wall in register with the aperture in said further wall for projecting another image of the person through the wall aperture onto a third part of the piece of photographic paper and a fourth objective mounted on the second wall in register with the reflective surface of said further wall and in optical registration with said predetermined third location for the matrix, for projecting another image of the matrix onto said reflective surface, to be reflected through an angle onto a fourth part of the piece of photographic paper; and wherein said means for mounting the matrix inside the cabinet at the predetermined location comprises a slidable frame, guide means for slidably supporting the slidable frame, means supporting the guide means relative to the photographic assembly and means for mounting the matrix in the slidable frame.

6. Apparatus for photographically producing an identity document with a picture of a person and a photographic record of identity data on a piece of photographic paper, comprising: a cabinet; a first location outside of the cabinet for the person to be photographed; means for storing reversible photographic paper inside the cabinet; a photographic assembly inside the cabinet; said photographic assembly comprising a plurality of walls in combination defining a dark chamber; a further wall extending diagonally across the interior of said chamber; one part of said further wall having an aperture therein; another part of said further wall bearing a reflective surface; means for feeding a piece of the photographic paper to a second location at one side of said chamber opposite a first one of the chamber defining walls; a first ojective mounted on said first wall in register with the aperture in said further wall for projecting an image through said aperture onto a first part of the piece of photographic paper; a second objective mounted on a second one of said chamber-defining walls in register with said reflective surface for said reflective surface to reflect an image, transmitted by said second objective, onto a second part of the piece of photographic paper; a matrix inside the cabinet; said matrix bearing data to be photographed on the piece of photographic paper; means for supporting the matrix inside the cabinet; means inside the cabinet for transmitting an image of the person at said loation to one of said objectives; means inside the cabinet for transmitting an image of the matrix to the other objective; means for developing the piece of paper after the person and the matrix have both been photographed; and means for enabling the piece of photographic paper after development to be withdrawn from the cabinet.

* * * * *